US007788661B2

(12) United States Patent
Axnix et al.

(10) Patent No.: US 7,788,661 B2
(45) Date of Patent: Aug. 31, 2010

(54) METHOD AND SYSTEM FOR APPLYING PATCHES TO A COMPUTER PROGRAM CONCURRENTLY WITH ITS EXECUTION

(75) Inventors: Christine Axnix, Steinenbronn (DE); Michael Mueller, Leonberg (DE); Hartmut Penner, Herren Berg (DE)

(73) Assignee: International Business Machines Corporation, Armonk, NY (US)

( * ) Notice: Subject to any disclaimer, the term of this patent is extended or adjusted under 35 U.S.C. 154(b) by 1209 days.

(21) Appl. No.: 11/372,659

(22) Filed: Mar. 10, 2006

(65) Prior Publication Data
US 2006/0242491 A1    Oct. 26, 2006

(30) Foreign Application Priority Data
Mar. 11, 2005   (DE)  ................................. 05101910

(51) Int. Cl.
G06F 9/44 (2006.01)
G06F 9/34 (2006.01)
(52) U.S. Cl. .................................. 717/168; 711/206
(58) Field of Classification Search ........................ None
See application file for complete search history.

(56) References Cited

U.S. PATENT DOCUMENTS

| 5,321,844 | A |   | 6/1994  | Schwagmann |           |
|-----------|---|---|---------|------------|-----------|
| 5,481,713 | A | * | 1/1996  | Wetmore et al. | 717/170 |
| 5,790,856 | A | * | 8/1998  | Lillich     | 717/163  |
| 5,884,020 | A | * | 3/1999  | Portch et al. | 714/9  |
| 5,938,766 | A | * | 8/1999  | Anderson et al. | 713/100 |
| 6,189,145 | B1| * | 2/2001  | Bellin et al. | 717/170 |
| 6,202,208 | B1| * | 3/2001  | Holiday, Jr. | 717/166 |
| 6,314,567 | B1| * | 11/2001 | Oberhauser et al. | 717/170 |
| 6,341,321 | B1| * | 1/2002  | Glassen et al. | 710/104 |
| 6,594,822 | B1| * | 7/2003  | Schweitz et al. | 717/140 |
| 6,748,584 | B1| * | 6/2004  | Witchel et al. | 717/136 |
| 6,948,164 | B2| * | 9/2005  | Tinker     | 717/168  |
| 7,596,621 | B1| * | 9/2009  | Knee et al. | 709/230 |
| 2004/0107416 | A1 | * | 6/2004 | Buban et al. | 717/170 |

FOREIGN PATENT DOCUMENTS

EP    0 492 251 B1   12/1991
EP    0 757 314 A1    7/1996

* cited by examiner

Primary Examiner—Tuan Q Dam
Assistant Examiner—Zheng Wei
(74) Attorney, Agent, or Firm—Roy W. Truelson

(57) ABSTRACT

The present invention relates to a method, a computer program product and a system of adding new static data variables and initialisation routines for these variables as part of a method of replacing a current version of a computer program with a replacement version of the program concurrently with the execution of the program on a computer system. This replacement version consists of new machine code completely replacing the existing version, new static data variables and initialisation routines for these variables. The content of the existing static variables will be preserved during the application of the concurrent patch. The concurrent patch can be revoked and the new static data variables can be removed such that the computer program that was executed before the application of the concurrent patch will be executed again.

13 Claims, 11 Drawing Sheets

METHOD AND SYSTEM FOR APPLYING PATCHES TO A COMPUTER PROGRAM CONCURRENTLY WITH ITS EXECUTION

FIELD OF THE INVENTION

This invention relates to a method of applying patches to a computer program code concurrently with its execution on a computer system, a computer system for executing the method and a computer program product containing code to execute the method.

BACKGROUND OF THE INVENTION

Computer users have long had a need for continuous non-disrupted operation. Therefore methods have been developed to modify and update computer programs concurrently with their execution with new code (a patch) that is loaded into the computer.

Typically, a computer program consists of different sections such as executable machine code, static data variables, and temporary data. The executable code can be comprised of various procedures, which are called via their address in memory. A static data variable is kept valid in the same memory address during the entire execution of the program. In contrast, a temporary data variable (and its location in memory) is only valid during certain periods of the program execution; e.g., while a specific procedure executes.

A patch to computer program code can replace some or all of the complete computer program code. Methods that replace only parts of a computer program are described in the U.S. Pat. No. 5,321,844, the European patent EP0492251B1, and the European patent application EP0757314A1.

The main processor firmware in existing IBM eServer zSeries systems can be patched concurrently such that the complete computer program code is replaced. The method used there assumes that it is possible to replace the currently running code with new code at a time when the temporary data are irrelevant to program execution. In particular, the z-series method ensures preservation of the static variables and their content.

The static variables are used to represent the state of the computer system that is controlled by the firmware, and especially they are used to represent the state of the firmware itself. Since the firmware contributes to the reliability, availability, and service characteristics of the IBM eServer z-series platform to a very large extent, it was an acknowledged practice for the last 10 years among the z-series firmware architects not to touch the static variables of the firmware at all during a concurrent patch operation in order to prevent any system instabilities or failures.

The concurrent patch operation is executed by a concurrent loader process which runs as a background task. The concurrent loader loads new computer program code (so called code load) into the computer system memory and prepares this code for execution. Once the loading and preparation is completed, the concurrent loader brings the computer program to be patched into a state where temporary data can be ignored during the concurrent patch operation. Finally, it switches from the old code to the new code in an atomic operation. This entire procedure is called the application of a concurrent patch.

The preparation of the new program code for its execution consists of resolving and adapting all address references in the code load to the addresses of the memory section into which the code is loaded. This step performed by the concurrent loader is also known as relocation. Therefore a standard linker program can be used for the generation of the program code that does not need special knowledge about the concurrent patch procedure. This makes the concurrent patch application transparent to the programmer. In fact, there is no difference for a code load that can be used for a concurrent patch application to one which can be loaded by a loader that is not a concurrent loader.

The format of the computer program code and the format of the code load used for the concurrent patch is the standard ELF (Executable and Linking Format) format and any linker program that supports the ELF format can be used. A code load in the ELF format can be used for a concurrent patch and it could be loaded by any zSeries-compliant loader that supports the ELF format, which is not necessarily a concurrent loader.

But the main processor firmware in existing IBM eServer zSeries products does not support the addition of new static variables during a concurrent patch application. When static variables are discovered by the concurrent loader during the application of a concurrent patch, the system aborts the application of the patch and continues to use the old version of the program.

Another disadvantage is that it is not possible for the zSeries main processor firmware to discover that a concurrent patch is revoked. The revoking is performed by triggering another concurrent patch application and using the original computer program as the code load. In a typical situation there are various subsequent levels of a computer program and in most cases it is sufficient to switch one level back.

SUMMARY OF THE INVENTION

It is therefore an object of the present invention, to provide a method, system, and program product to apply patches to a computer program concurrently with its execution that is improved over the prior art.

In an important aspect the present invention provides the possibility to introduce new static variables by a concurrent patch, while the existing static variables and their content are preserved. For example, it is possible to concurrently add the support for new hardware that was attached to a computer system (e.g., new I/O adapters) in the firmware running on the system.

Another important aspect of the present invention is that the addition of static variables is transparent for the programmer. There is no need to know how the application of concurrent patches is implemented. There is no difference for the addition of a new static variable to the program source code compared to the case when it is not planned to patch the program concurrently. Existing compiler and linker programs can be used without changes.

The present invention also provides the capability to initialise the new static data variables dynamically using optional initialisation routines. These routines contain instructions to determine the variable value and are executed during the application of the concurrent patch. This offers more flexibility compared to the static initialisation with a fixed value known at compilation time.

With the introduction of new static data variables in one level of a computer program, it is possible to discover that the patch is revoked: If a static data variable of the computer program that is currently executed is marked as a static data variable that was added during a concurrent patch application, and it is not found in the code load that is currently applied as a concurrent patch, then the previous concurrent patch application is revoked. Now it is possible to execute code that allows a computer system to react accordingly to such a revoke operation and therefore increasing the scope of patches that can be applied concurrently. An example of such code is a clean-up routine associated to a new static data variable.

With the acknowledged practice in mind not to touch the static data variables it was especially not obvious that it is possible to introduce new static data variables with a concurrent patch such that it is possible to remove these static data variables once the patch needs to be revoked.

The advantages of the present invention are accomplished by the following mechanism. A new static variable is declared in the source code of the code load with an optional initial value. In case the new initial value is not a constant an initialisation routine can be provided in the source code of the code load instead. If neither an initial value nor an initialisation routine is provided, then the variable needs to be initialised during the regular execution of the patched program. An initialisation routine has to be associated with the variable; e.g., by using a unique naming convention. The initialisation routine contains code which will initialise the new static variable. This code performs the same actions that would normally be executed during initial load time of the computer program code.

When the concurrent loader applies a concurrent patch, it loads the content of a new code load to the memory of the computer system. When it detects a new static variable in the new code load then it checks for the corresponding initialisation routine which is inserted in a list called init-routine list for later execution. The concurrent loader allocates and instantiates the new static data variable as an extension to the existing static data. Then the references to the new static variable in the new code are relocated using standard relocation mechanisms. When the variable contains a value which requires relocation, the relocation is performed using standard relocation mechanisms.

Before the new code is executed the first time, the concurrent loader will execute all initialisation routines from the init-routine-list. Then the loader drops the init-routine-list and switches to the new code in an atomic operation; i.e., an operation that cannot be interrupted. After this atomic switch the new code has replaced the old code and its new static data variables are active in the system but the old static variables and their content are still used by the new code. The new static variables are now completely integrated and there is no difference in characteristics between the new static data variables and any static variables created during the initial load time of the computer program code.

In order to use the present invention, thorough knowledge of the computer program code format that is produced by the linker program and that has to be loaded to a computer system (and also of the algorithms needed for the load operation) is required. In the past, much research and development work has been performed in the area of compiler theory, but not much work has been done in the field of linkers and loaders. The present invention is one contribution to the latter field.

BRIEF DESCRIPTION OF THE DRAWINGS

For a brief overview of the present invention, and the advantages thereof, reference is now made to the following descriptions taken in conjunction with the accompanying drawings.

DETAILED DESCRIPTION

Introduction

Figure 1:
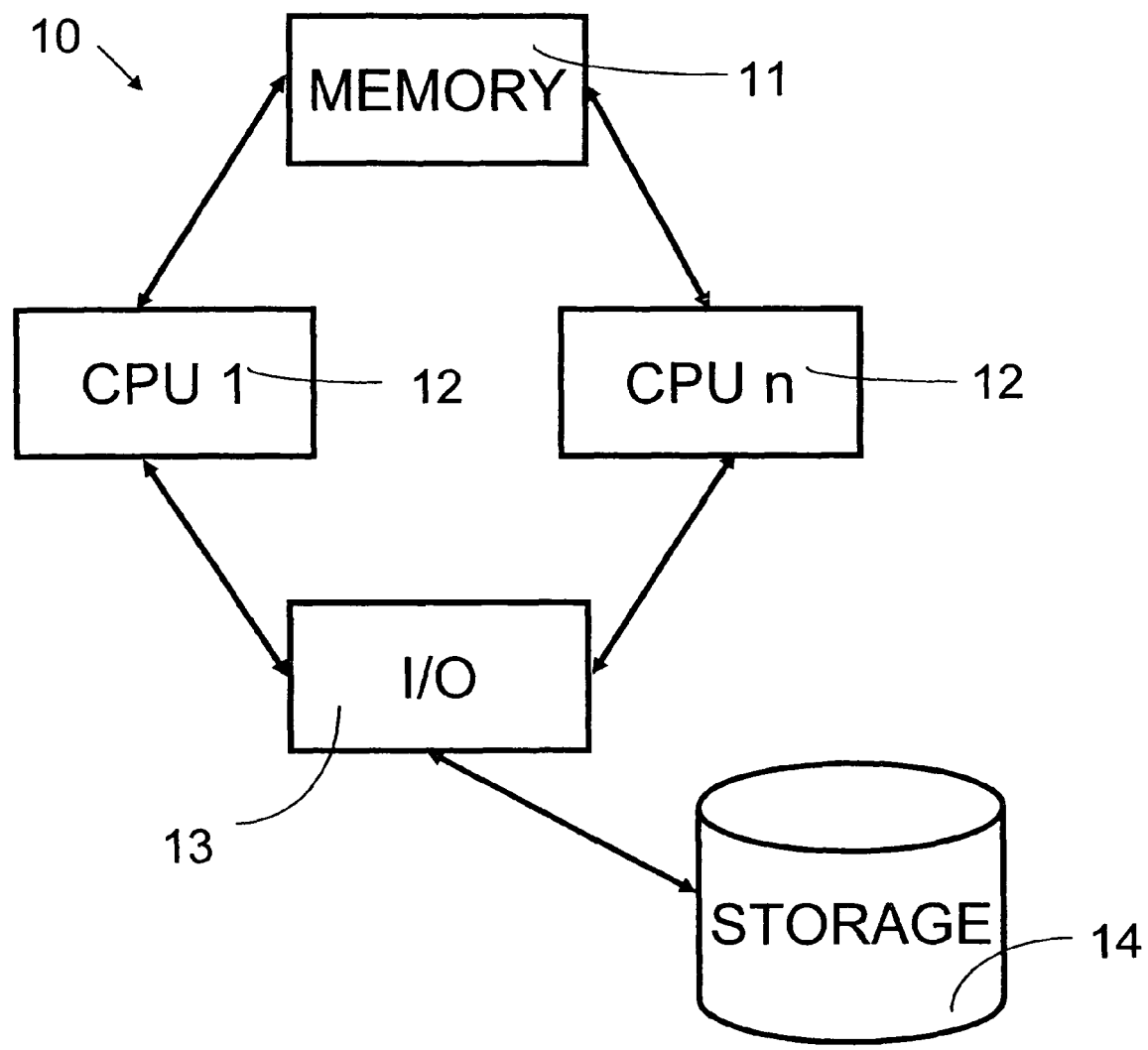
FIG. 1 is a block diagram of a computer system into which the invention can be implemented.

FIG. 1 illustrates a computer system 10 in which the present invention can be used. A shared memory 11 is coupled to one or more Central Processing Units (CPUs) 12. These CPUs 12 are also coupled to an I/O subsystem 13. A storage device 14 is accessible for the CPUs 12 via the I/O subsystem 13. The memory 11 is divided in memory words which have a unique address used by the CPUs 12 to access their content.

The computer system 10 can execute multiple computer programs. This can be achieved running an operating system kernel capable to support multitasking or multiprocessing. For this invention it is sufficient that a simple dispatching program is present, which is capable to distribute multiple work requests to the CPUs 12, which can have different priorities. The dispatcher is choosing the next work request from a queue of work requests based on the priorities of the requests in the queue. The work requests itself are computer program code each.

Usually, a computer program is implemented in a high-level programming language such as C or PL-8. The computer program code that can be loaded on the computer system 10 by a normal or a concurrent program loader is then generated from the high-level language implementation via a compiler and a linker program. Typically, the output of such a linker program is a Position Independent Code, which needs to be translated in Position Dependant Code when the code is loaded into the computer system memory 11. For example, the ELF format supports both variants.

Figure 2A:
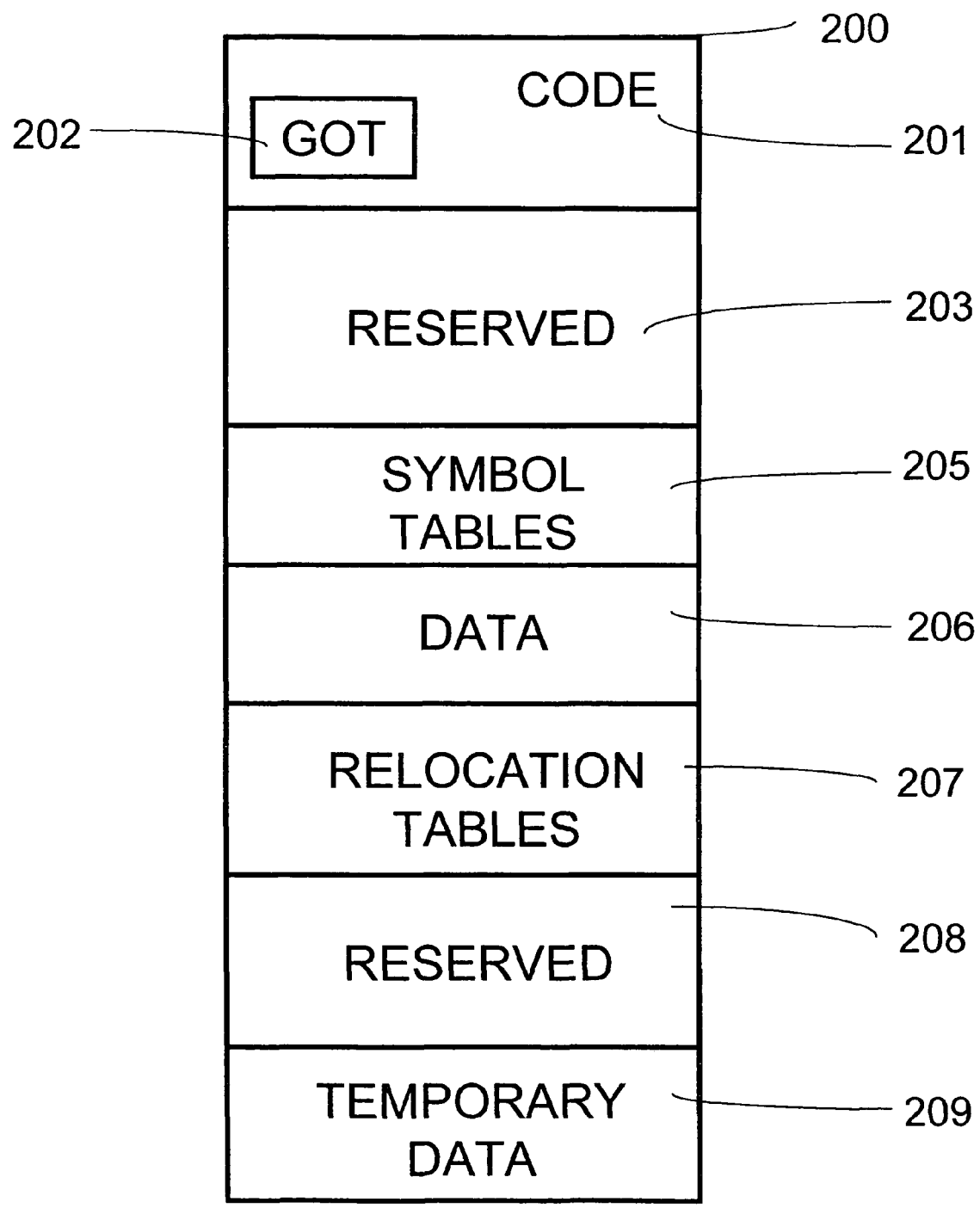
FIG. 2a is a schematic representation of computer program code in the memory of the computer system of FIG. 1 before any concurrent patch is applied.

Referring to FIG. 2a, the computer program code 200 initially loaded in the memory 11 of a computer system 10 comprises a section for the currently executed machine code 201 that can be executed by the CPUs 102, a subsection of a global offset table (GOT) 202. Another reserved section 203 is used by the concurrent loader for the new machine code of a concurrent patch, a section for the symbol tables 205, a section for the static data variables 206, another section for the relocation tables 207, and a section 208 of reserved space. The section for the relocation tables 207 comprises of several relocation tables. For this invention the following are important: A relocation table for the machine code, the relocation table for the GOT 202 of the machine code 201, and the relocation table for the static data variables.

Figure 3:
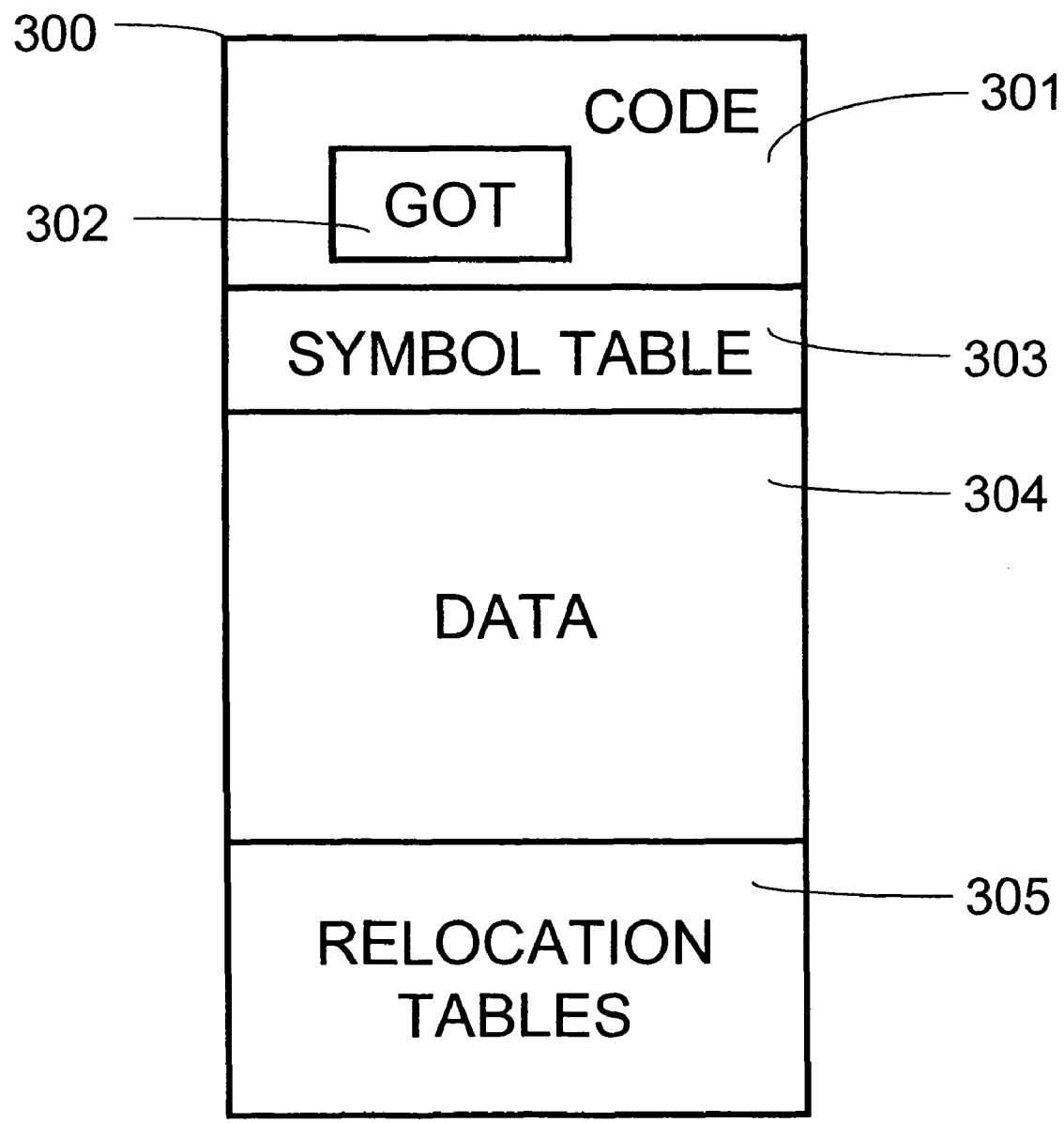
FIG. 3 is a schematic representation of a code load that can be used for a concurrent patch of the computer program running on the computer system of FIG. 1.

As shown in FIG. 3, the content of a code load 300 that can be used for a concurrent patch as stored on a storage device 14 consists of a section of machine code 301 that can be executed by the CPUs 12 including a subsection of a GOT 302, a section for a symbol table 303, a section 304 for the static data variables, and a section for the relocation tables 305. The content of a static variable stored in the data section 304 can be either initialised with a constant value that was known at the time when the code load was created by a translation program from its sources, or it can be initialised with a reference to another static variable, or it can be not initialised. When it is not initialised, an initialisation routine can be provided in the code section 301 of the code load 300. If such a routine is not provided, then the variable needs to be initialised during the normal program execution. Among the relocation tables 305, there is one relocation table for the code section 301, one for the GOT 302 of the code section 301, and one for the data section 304.

Figure 4:
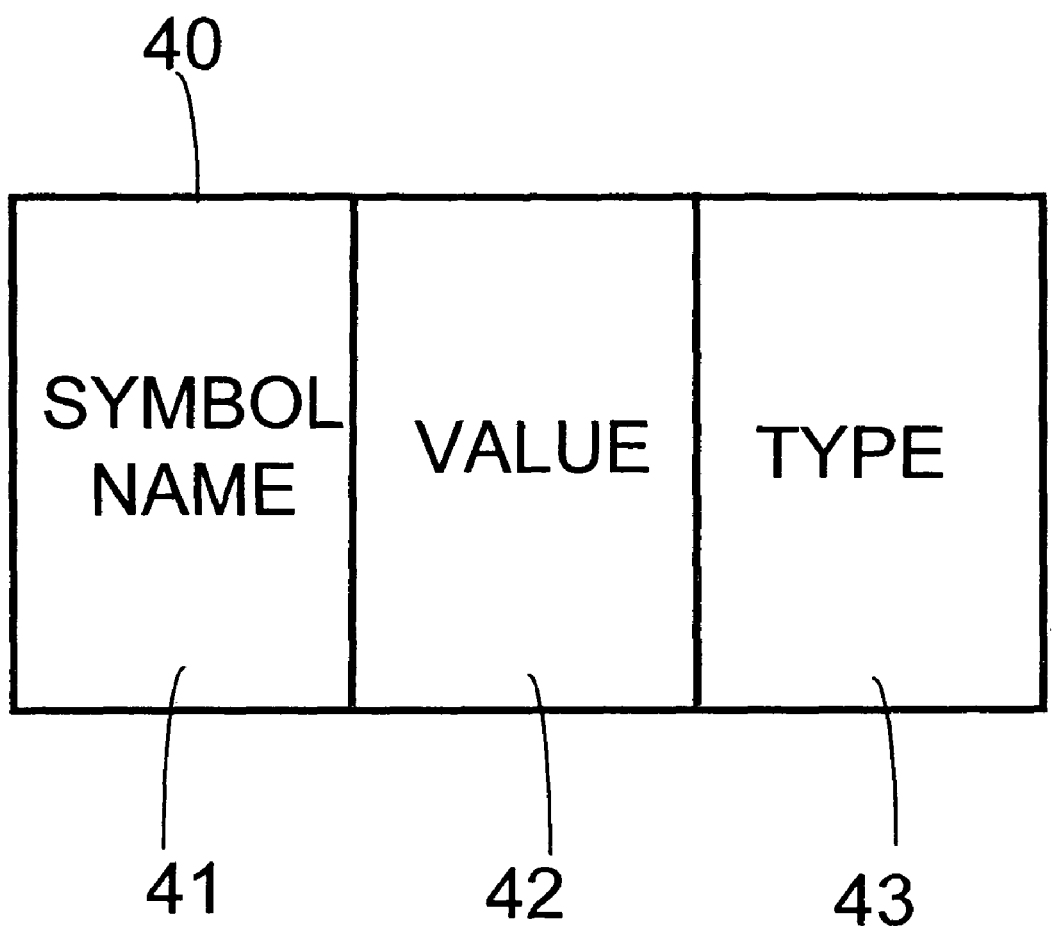
FIG. 4 is a schematic representation of an entry of a symbol table as used in FIGS. 2a, 2b, 2c, and FIG. 3.

The symbol tables 205 and 303 contain a list of all the procedures and static variables of the computer program code 200 and the code load 300, respectively. This list can be implemented as an array for example. An entry 40 of the symbol table is shown in FIG. 4 (restricted to the characteristics important for this invention) and also called a symbol. It consists of a symbol name 41, a value field 42, and a type 43. The symbol name 41 of a symbol 40 must be unique for every entry in the symbol tables 205 and 303. The type 43 specifies if the entry 40 relates to a procedure or to a static data variable. The content of the value field 42 is the memory address where the symbol (the procedure or static variable that is associated to this symbol table entry 40) is located in the computer memory 11.

Figure 5:
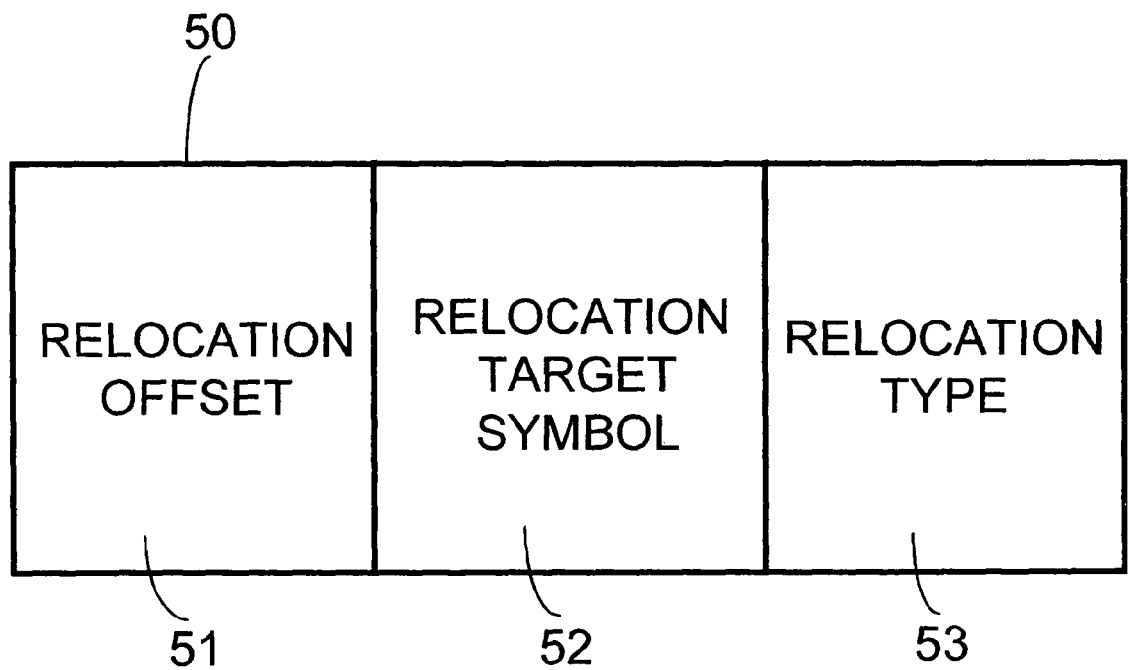
FIG. 5 is a schematic representation of an entry of a relocation table as used in FIGS. 2a, 2b, 2c, and FIG. 3.

The relocation tables contain a list of address constants that must be recalculated when the code or data is copied to another place in the computer memory 11 than pre-calculated by the linker program when it was generating the program code of the code load. An entry 50 of the relocation table is shown in FIG. 5 (restricted to the characteristics important for this invention). It consists of an relocation offset 51, specifying the memory address of the address constant that needs to be recalculated, information about the relocation target symbol 52 that the address constant points to, and the relocation type 53 which can; for example, specify whether the reference to the target symbol is an absolute or relative address reference.

Accesses from the code to the static data variables can be either direct accesses, or, for position independent code, indirect accesses via a GOT. A GOT is an array of memory addresses as used by the CPUs 12 to access a word in the memory 11 of the computer system 10. An entry in the GOT corresponds to a symbol in the symbol table. The relocation table for the GOT specifies which entry in the GOT corresponds to which symbol. For an indirect access of a static variable via the GOT, the code loads the pointer to the global data variable from the GOT.

Prior-Art Patch Application

Figure 2B:
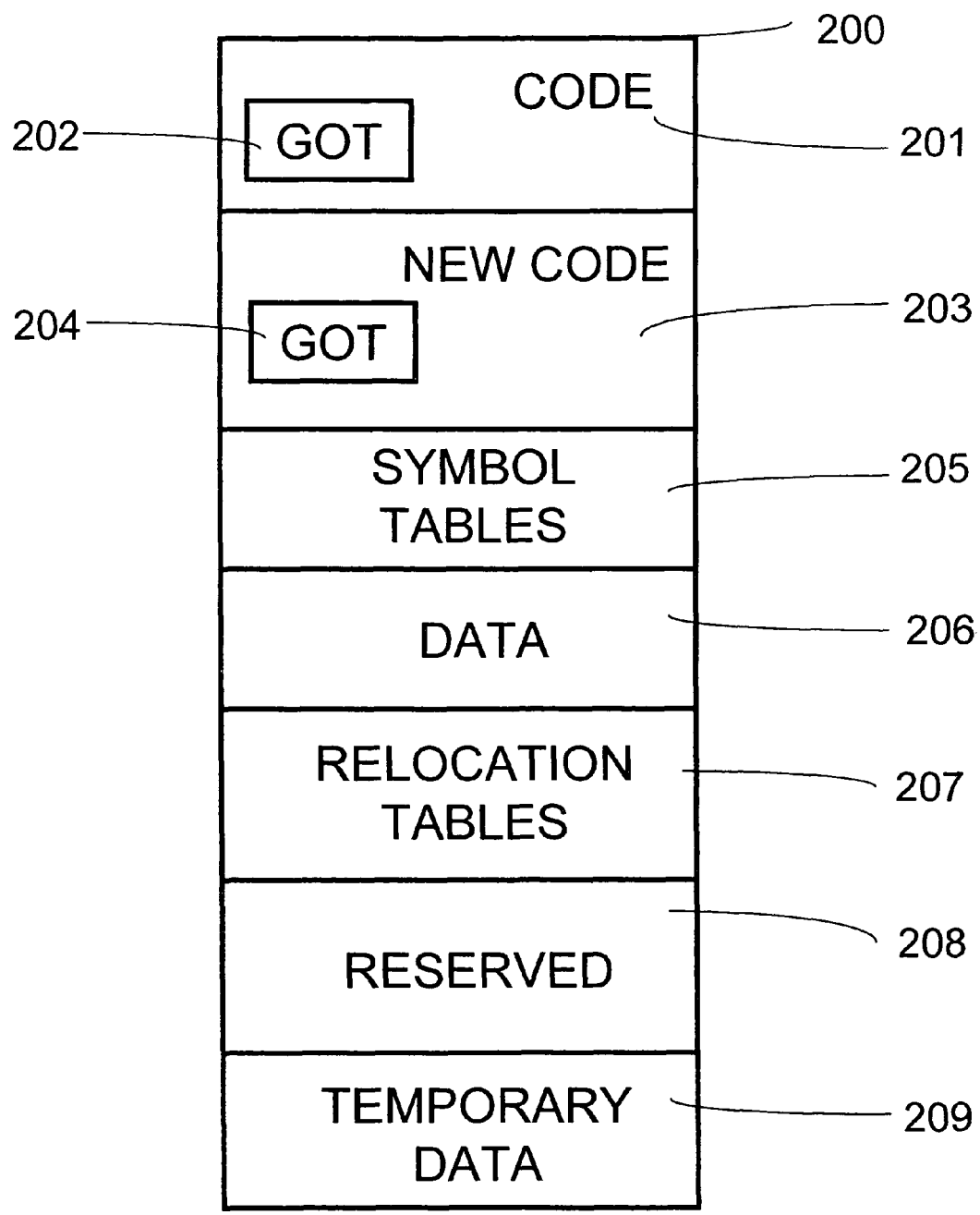
FIG. 2b is the same representation as FIG. 2a, except that the application of the concurrent patch has started.
Figure 2C:
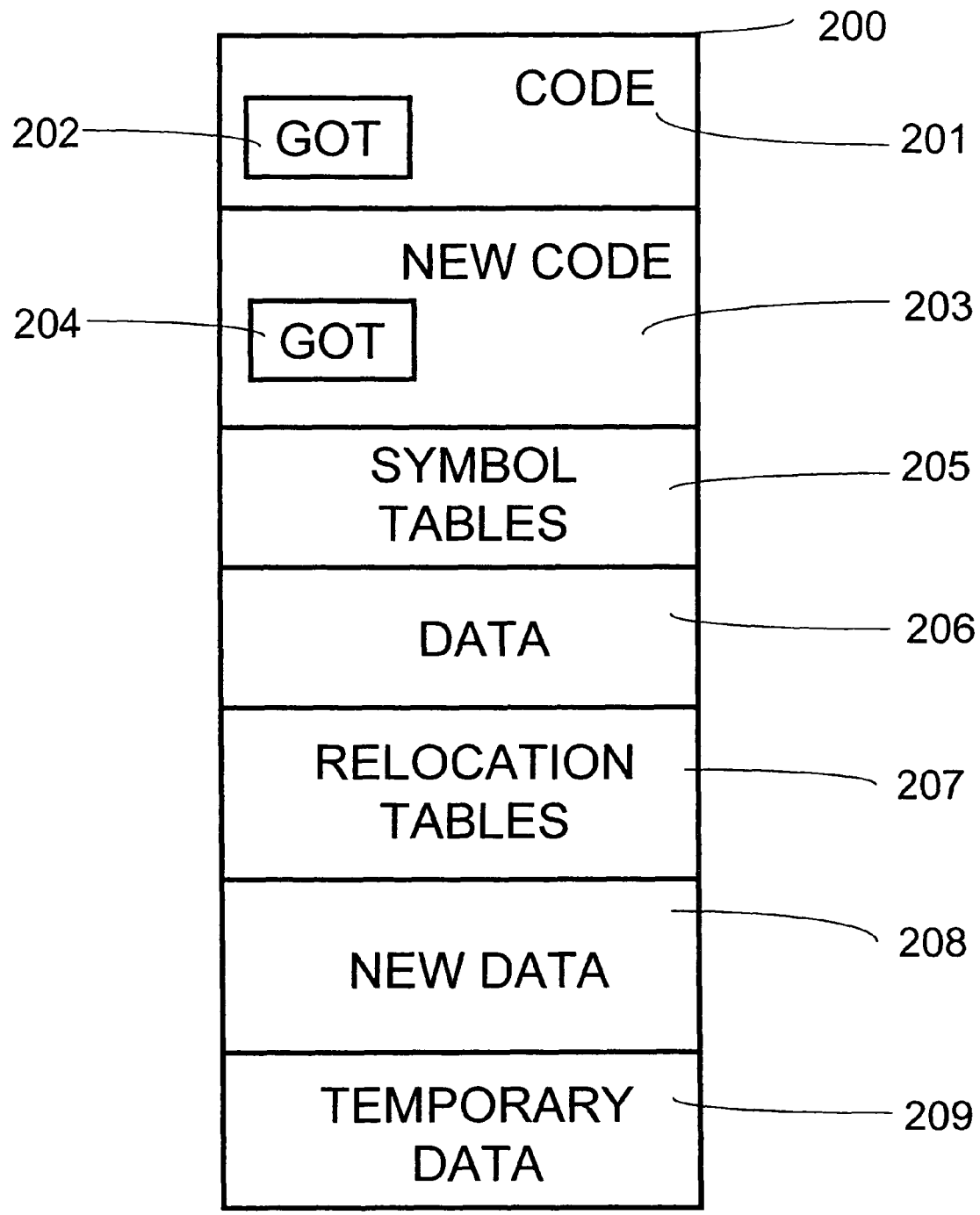
FIG. 2c is the same representation as FIG. 2b, except that the application of the concurrent patch has started using the method of this invention.
Figure 6A:
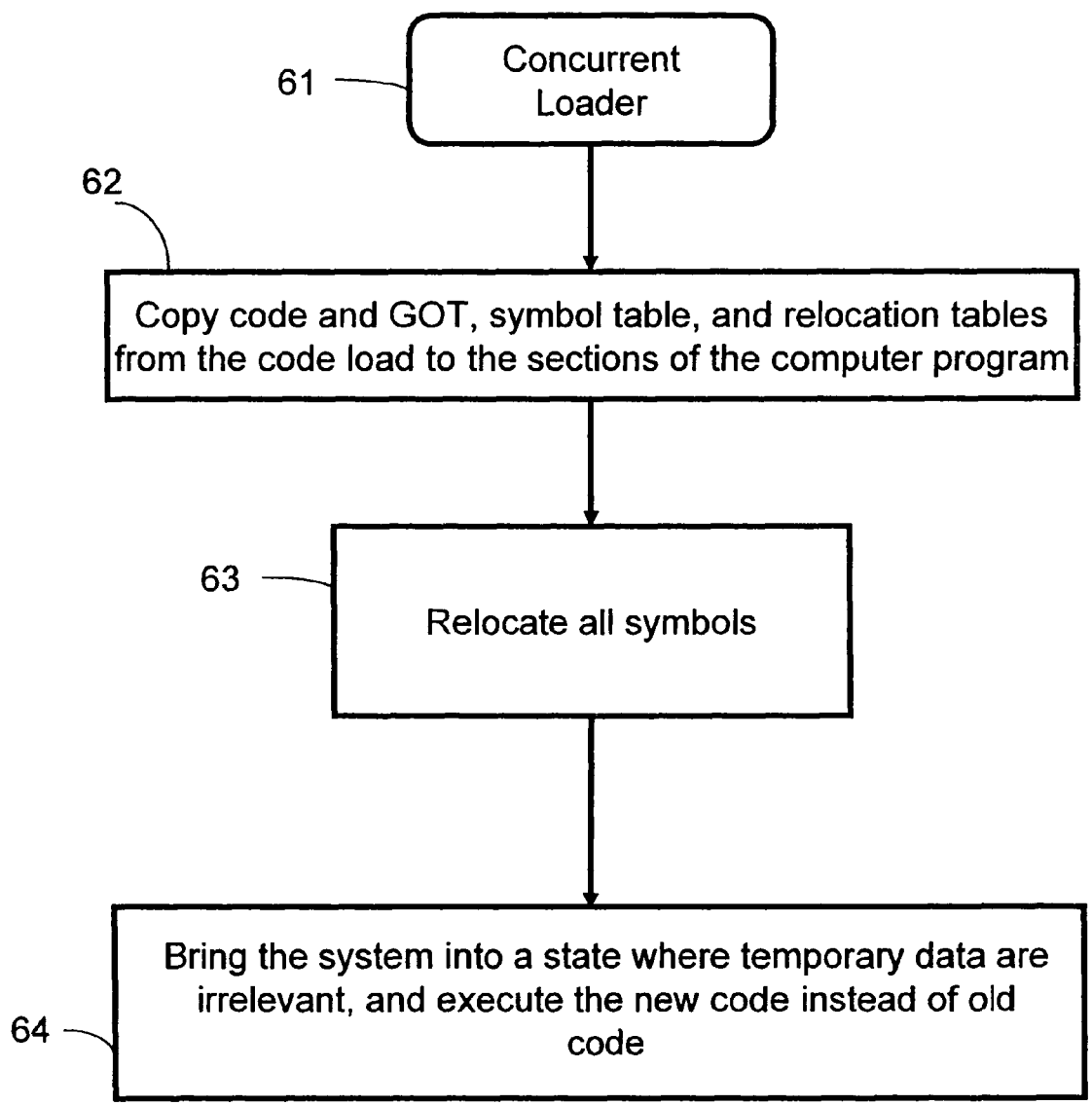
FIG. 6a shows the steps performed by the concurrent loader when applying concurrent patches to the computer program code.

The concurrent loader is running as a background task on the computer system 10. FIG. 6a shows the steps performed by the concurrent loader 61 when applying a concurrent patch. In the first step 62 the section of machine code 301 including its GOT section 302 is copied from the code load 300 on storage 14 to the section 203 reserved for new machine code in the computer program code 200. FIG. 2b shows the section for the new code 203 and the subsection for its GOT 204. Then also the symbol table 303 of the code load is copied to the section of the symbol tables of the computer program code 205 preserving the existing symbol table. This is important since the original symbol table is in use by the computer program code 200 and as the concurrent loader is running as a background process changes in parallel are complicated.

The relocation tables 305 of the code load 300 are added to the relocation tables 207 of the computer program code 200 as follows: The relocation tables for the machine code 301 and for its GOT 302 replace the relocation tables for the machine code 201 and its GOT 202 in the section of the relocation tables 207. This is possible since the relocation tables are no more needed for the execution of the machine code 301 (those are needed for the initial load of the computer program code 200 only). The relocation table for the static data section 304 is ignored in this step.

Figure 7A:
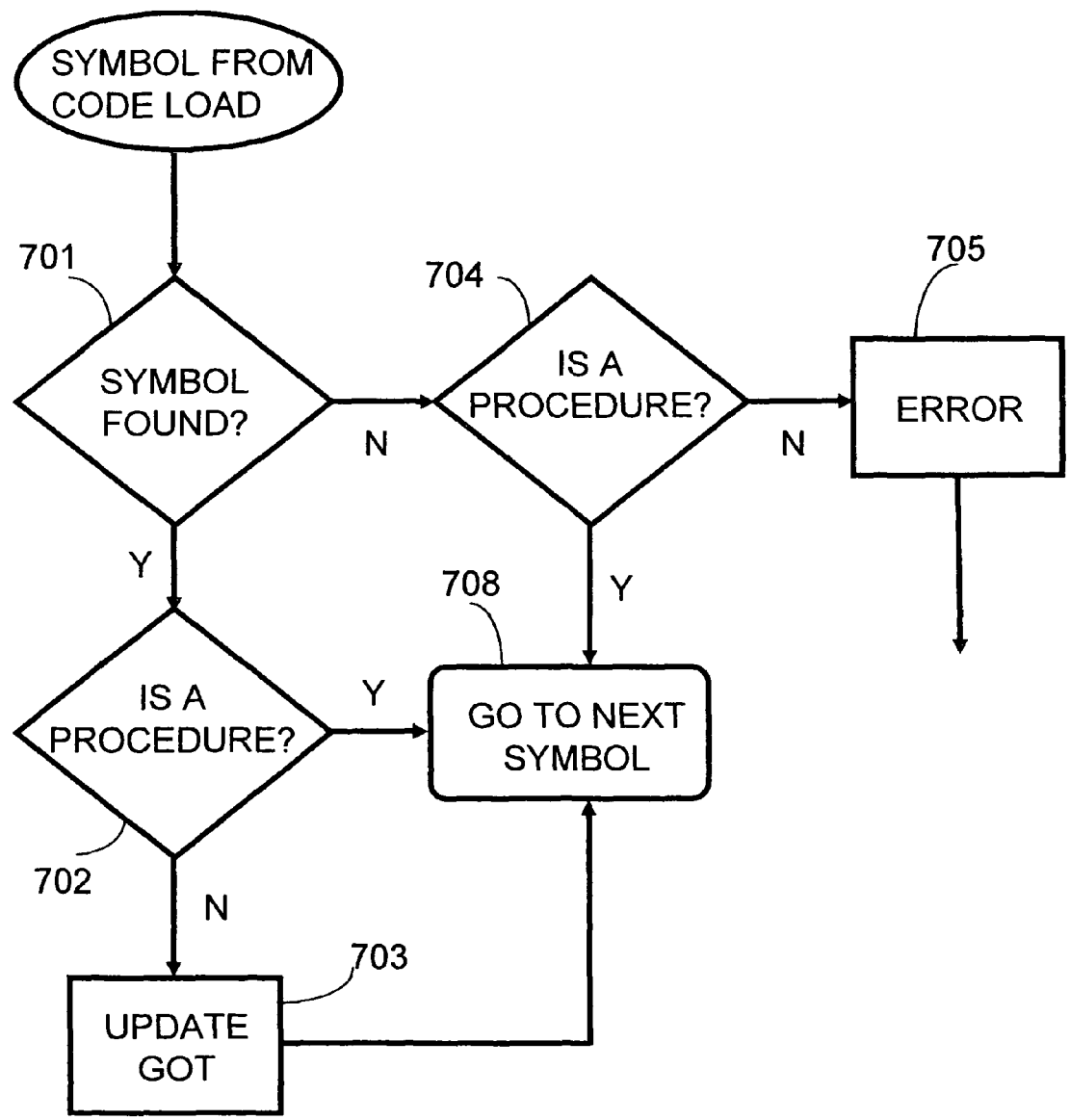
FIG. 7a shows the steps performed by the concurrent loader when processing an entry of the symbol table of the code load.

In the next step 63 each entry in the symbol table 303 of the code load 300 is being processed. These processing steps are known as relocation and shown in FIG. 7a. If (step 701) the symbol name of the entry is found as a symbol name of an entry in the symbol table of the currently executed computer program 200, said symbol table stored in the section of the symbol tables 205 of the computer program code 200, and it is a static variable (when it is not a procedure: step 702; otherwise continue with the next symbol: step 708) then (step 703) the address as stored in the GOT 202 of the computer program product is stored in the GOT 204 of the new machine code 203 (see FIG. 2b). The associated entries in each GOT are found via the associated entries in the corresponding relocation table: The symbol address is found by searching for the symbol name as specified in the relocation table in the (old) symbol table of the computer program 200. Further, the value field 42 of the symbol table entry 40 is updated such that it contains the correct memory address. After step 703 the next symbol will be processed in step 708.

If (step 701) the symbol name of the entry is not found in the symbol table of the currently executed computer program 200, said symbol table stored in the section of symbol tables 205 of the computer program code 200, then it is either a new procedure or a new static data variable (step 704). For a new static data variable prior art methods either choose to present an error (step 705) or simply ignore the new variable.

Once all the entries in the symbol table 303 of the code load 300 have been processed (step 63), then in the final step 64 the concurrent loader brings the computer system 10 to a state where the temporary data 209 of the computer program code 200 is not essential to the operation of the computer system 10. For example, this can be achieved by synchronizing all the CPUs 12 such that they all wait on the same place in a machine code. To achieve this, the concurrent loader creates a special work request task with low priority. This ensures that all higher priority tasks are executed before the low priority task starts. This special work request task contains machine code, which lets the CPUs 12 execute a special wait operation.

Then the instruction pointers of the CPUs 102 are changed such that they now point to the beginning of the section of new machine code 203. All the CPUs are now triggered to continue their execution using the new machine code 203 instead of the old one 201, which is obsolete.

Since the data section 206 was not touched, and the corresponding entries in the section of the symbol tables 205 are still available, the old static data variables and their content were preserved during the application of the concurrent patch.

Static Variable Introduction

Figure 6B:
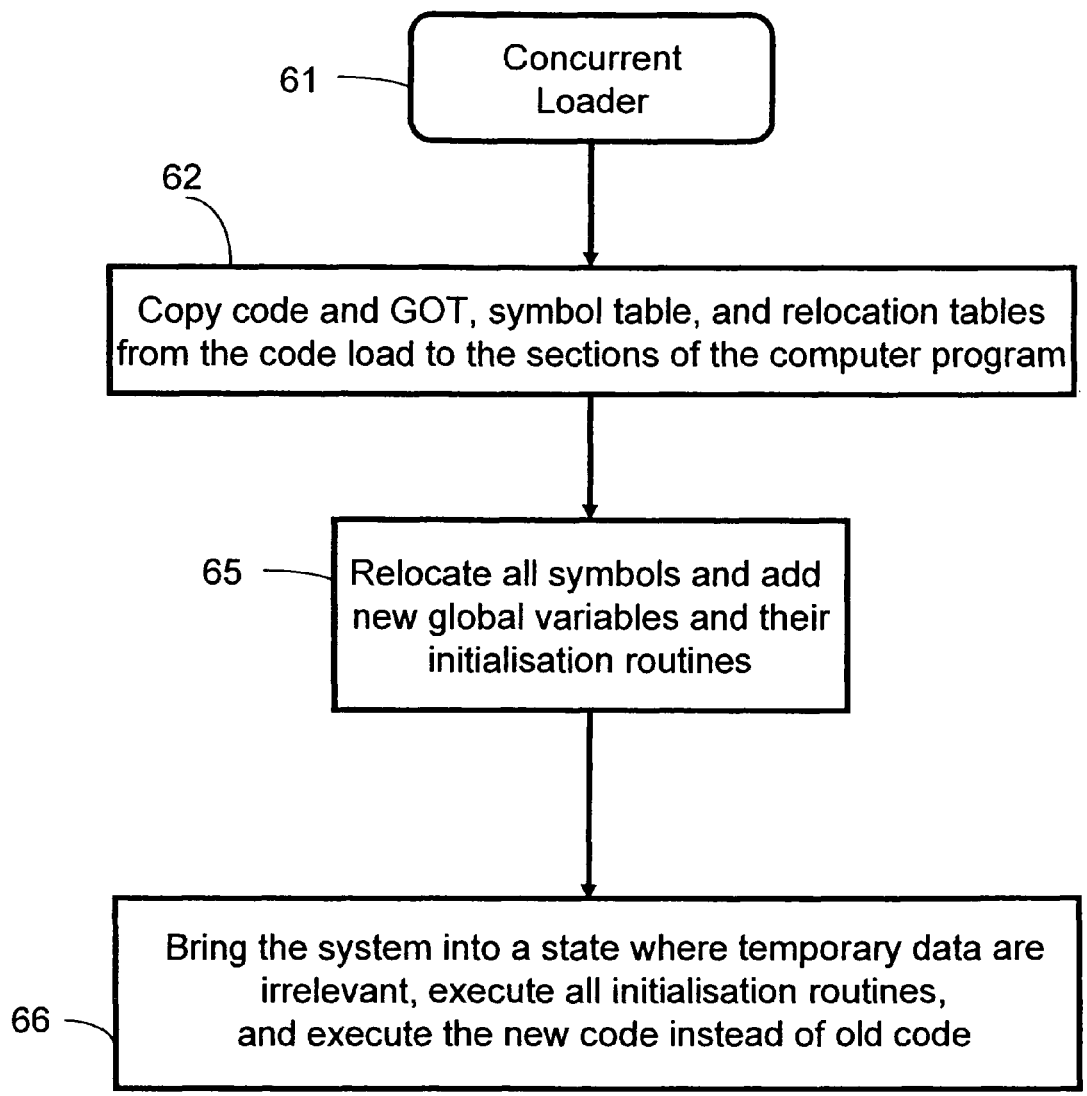
FIG. 6b shows the steps performed by the concurrent loader when applying concurrent patches to the computer program code in accordance with the present invention.

The present invention modifies the symbol relocation step 63 when applying a concurrent patch. This changed step 65 is shown in FIG. 6b. New static variables are part of a code load 300 in its data section 304. Optional initialisation routines for the new static variables are part of its code section 301.

Figure 7B:
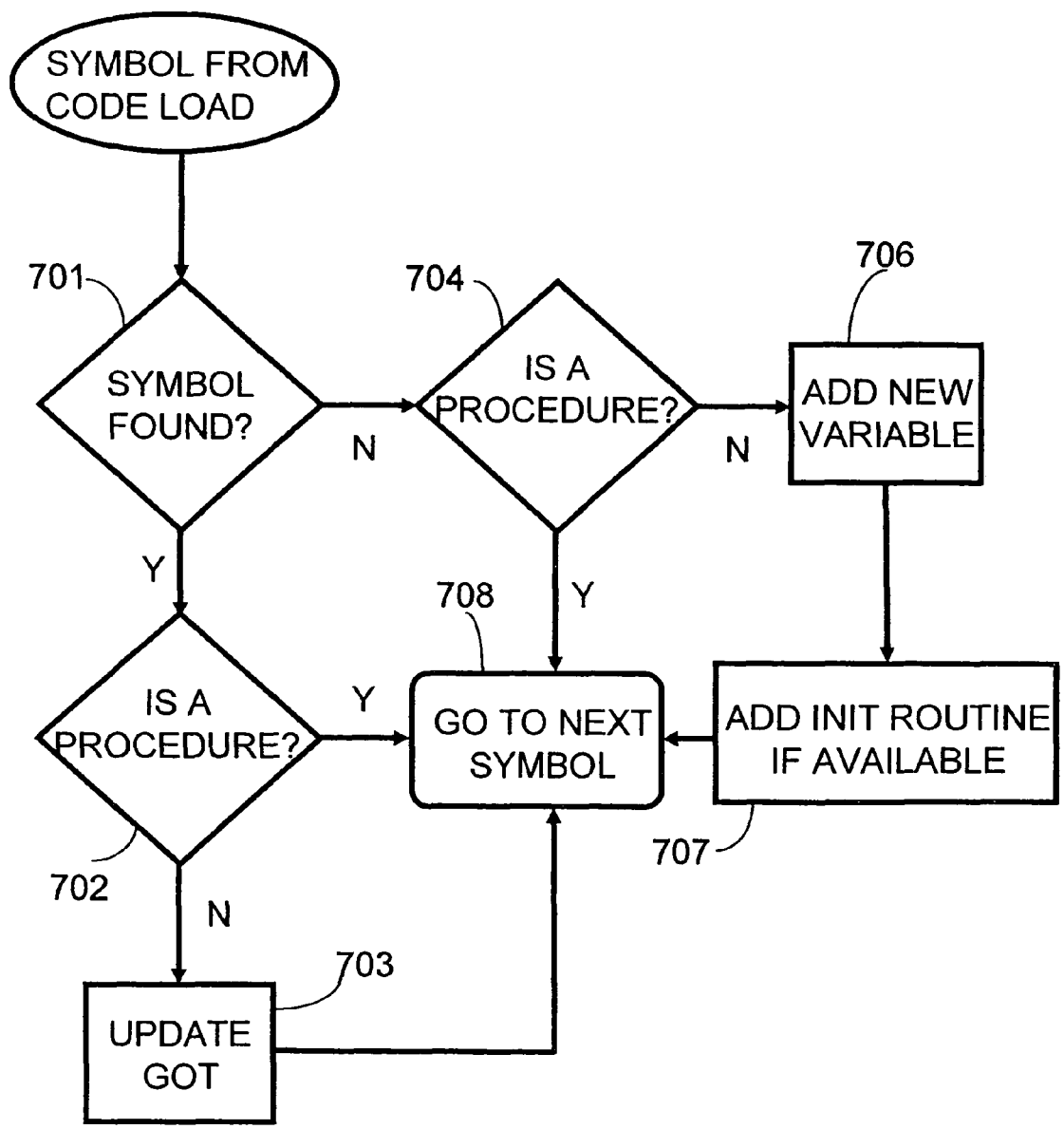
FIG. 7b shows the steps performed by the concurrent loader when processing an entry of the symbol table of the code load using the present invention.

Instead of presenting an error as in step 705, the concurrent loader that is adapted to execute the present invention is adding the new static data variable to the new data section 208 of the computer program code 200 (step 706) as shown in FIG. 7b.

In order to achieve this, the symbol table entry is copied from the symbol table 303 of the code load 300 to the end of the symbol table of the currently executed computer program, said symbol table stored in the section of symbol tables 205 of the computer program 200. Further the value field 42 of the copied symbol table entry 40 is updated by the concurrent loader such that it contains the correct memory address. The concurrent loader is further adding the corresponding entry in the data relocation table contained in the section 305 of relocation tables of the code load 300 to the data relocation table contained in the section 207 of relocation tables of the computer program code 200. The relocation offset 51 of the relocation table entry 50 is changed such that it points to the new static data variable.

Then it continues to search for an initialisation routine of the new static data variable (step 707). For the preferred embodiment of this invention, such a routine is identified in the symbol table 303 of the code load 300 with a unique naming convention for the symbol name of the associated entry in the symbol table 303; for example, a special prefix or postfix string for the symbol name could be used as an indicator. An initialisation routine is linked to the code load 300 such that it is contained in its code section 301. If an initialisation routine is found in the symbol table 303, then its address is copied to a list called the init-routine-list, which is stored in the section 208 for the new static data variables by the concurrent loader.

When a new static data variable is added (step 706) to the new data section 208 of the computer program code 200, then it must be checked if the content of the new data variable is a reference to another static data variable. This check is done by searching if there is an entry in the data relocation table stored in the section of the relocation tables 305 of the code load 300 which points into the new variable. If such a data relocation table entry is found, it will be appended to the data relocation table in the section 207 of the relocation tables of the computer program code 200. The reference to the static variable will be replaced by the address of the referenced global variable (standard data section relocation methods). After the search for an initialisation routine (and its addition when available), the next symbol is processed (step 708).

Once all the symbols have been relocated, the present invention Step 66 in FIG. 6b is executed (instead of step 64 in FIG. 6a). The change is as follows: Once the computer system 10 has reached a state, where the temporary data of the computer program 200 is not essential, then the concurrent loader using the present invention will also execute all the initialisation routines from the init-routine-list. Afterwards the init-routine-list will be dropped.

As in the prior-art concurrent patch application, the data section 206 was not touched, and the corresponding entries in the section of the symbol tables 205 are still available, the old static data variables and their content were preserved during the application of the concurrent patch.

Revoking a Concurrent Patch

There is no restriction for the invention that a computer program code 200 can only be concurrently patched once. Then multiple new data sections 208 have to be used, and the sections for the code 201 and the new code 203 change their roles between two subsequent patch operations.

In a preferred embodiment of the present invention, an additional step is introduced between the steps 65 and 66 (see FIG. 6b). In this step the symbol table of the currently executed computer program 200, said symbol table stored in the section of symbol tables 205 of the computer program 200, is compared to the symbol table 303 of the code load 300. Starting with the first entry, every entry in the symbol table of the computer program 200 that belongs to a static data variable will be checked if an entry with the same symbol name is found in the symbol table 303 of the code load 300.

If no such entry is found in the code load 300, then the concurrent loader assumes that the code load 300 is the computer program that was replaced by the computer program 200 that is currently executed. It then stops comparing the symbol tables and deletes that static data variable that was not found in the code load and all the subsequent static data variables that are found when processing all the subsequent entries in the symbol table of the computer program 200, said symbol table stored in the section of the symbol tables 205 of the computer program 200. With the above assumption that the previous patch application is revoked, these static data variables are all the new static data variables that were introduced during the previous concurrent patch operation since for all the new static data variables that were added during the last concurrent patch application the corresponding entries in the symbol table 205 were added at the end of the symbol table 205.

The new static data variables are removed from the new data section 208. This way the memory that was used to store the new data variables is not lost during a patch revoke operation and can be used for the new static data variables that will be introduced in future concurrent patch applications.

In a preferred embodiment of the present invention, clean-up routines for a new static data variable are stored in a code load 300 that get executed in an additional step after step 65 and before step 66 (see FIG. 6b). Clean-up routines can be handled similar to the initialisation routines and they can be used for similar purposes as class destructor routines in object-oriented programming languages such as C++ or JAVA. The use of clean-up routines is not limited to the new static data variables. It is possible to have global clean-up routines in a code load that get executed during a patch revocation.

This invention is not limited to a computer program code 200 with fixed pre-allocated memory areas for the new machine code 203, the symbol tables 205, the relocation tables 207, the new static variables 208, and the temporary data section 209. It is also possible to use dynamic memory allocation methods instead.

The invention also works for a computer program code 200 and a code load 300 that do not make use of position independent code. In that case the GOT relocation tables and the GOTs are not needed; instead the references from code to data that need to be resolved are listed in the code relocation table.

This invention is preferably implemented as software, a sequence of machine-readable instructions, especially as so called firmware executing on one or more hardware machines that controls and monitors these hardware machines and is often used to implement well-defined interfaces to the hardware, which other programs (especially operating systems) can use. Static variables are used as a state vector by the firmware to represent the current state of a computer system. While a particular embodiment has been shown and described, various modifications of the present invention will be apparent to those skilled in the art.

The invention claimed is:

1. A method of applying patches to a first computer program concurrently with its execution on a computer system, the method comprising the steps of:
preparing a replacement computer program replacing said first computer program, said first computer program including a plurality of old static data variables, said replacement computer program including said plurality of old static data variables and at least one new static data variable not included in said first computer program, to create a replacement executable code load;
loading the replacement executable code load to a reserved memory area of said computer system while the first computer program is executing;
relocating each static data variable included in said replacement computer program while the first computer program is executing, wherein relocating comprises, with respect to each said static data variable included in said replacement computer program,
  (a) if the respective static data variable is an old static data variable, then associating each reference to the respective static data variable in the replacement computer program with a respective memory address in said computer system currently allocated to the respective static data variable for use by said first computer program, and
  (b) if the respective static data variable is a new static data variable, then allocating a respective unused memory address in said computer system to the respective static data variable and associating each reference to the respective static data variable in the replacement computer program with the respective unused memory address allocated to the respective static data variable;
bringing the computer system into a state where temporary data are irrelevant for the execution of the first computer program; and
switching the computer system to stop executing the first computer program and begin executing the replacement computer program, said switching being performed after said loading the replacement executable code load and said locating each static data variable included in said replacement computer program.

2. The method of claim 1, wherein said relocating each static data variable included in said replacement computer program comprises comparing entries in a symbol table of the first computer program with entries in a symbol table of the replacement executable code load, and, with respect to each said static data variable in the symbol table of the replacement executable code load which is a new static data variable, copying a corresponding symbol table entry for the new static data variable to the end of the symbol table of the first computer program.

3. The method of claim 1, with the further step of:
executing all initialisation routines in the code load for the new static data variables.

4. The method of claim 3 where the new static data variables and their initialisation routines are identified by unique names in accordance with a predefined naming convention.

5. The method according to claim 1, with the further steps of:
comparing the static data variables in the first computer program with the static data variables in the code load; and
executing exception routines if the comparing step detects static data variables in the first computer program that are not in the code load.

6. The method of claim 5, wherein for every static data variable in the first computer program which is not found in the code load an exception routine is executed.

7. The method of claim 6 where the static data variables and their exception routines are identified by unique names in accordance with a predefined naming convention.

8. A computer program product comprising a computer readable storage medium and a concurrent loader stored thereon, the concurrent loader comprising program code for carrying out, when said program code is executed on a computer system, the steps comprising:
loading a replacement executable code load to a reserved memory area of said computer system while a first computer program is executing, said replacement executable code load embodying a replacement computer program for replacing said first computer program, said first computer program including a plurality of old static data variables, said replacement computer program including said plurality of old static data variables and at least one new static data variable not included in said first computer program;
relocating each static data variable included in said replacement computer program while the first computer program is executing, wherein relocating comprises, with respect to each said static data variable included in said replacement computer program,
  (a) if the respective static data variable is an old static data variable, then associating each reference to the respective static data variable in the replacement computer program with a respective memory address in said computer system currently allocated to the respective static data variable for use by said first computer program, and
  (b) if the respective static data variable is a new static data variable, then allocating a respective unused memory address in said computer system to the respective static data variable and associating each reference to the respective static data variable in the replacement computer program with the respective unused memory address allocated to the respective static data variable;
bringing the computer system into a state where temporary data are irrelevant for the execution of the first computer program; and
switching the computer system to stop executing the first computer program and begin executing the replacement computer program, said switching being performed after said loading the replacement executable code load and said locating each static data variable included in said replacement computer program.

9. The computer program product of claim 8 where the program code is directly loadable into the internal memory of the computer system.

10. The computer program product of claim 8, wherein said relocating each static data variable included in said replacement computer program comprises comparing entries in a symbol table of the first computer program with entries in a symbol table of the replacement executable code load, and, with respect to each said static data variable in the symbol table of the replacement executable code load which is a new static data variable, copying a corresponding symbol table entry for the new static data variable to the end of the symbol table of the first computer program.

11. A computer system, comprising:
- at least one processor;
- a memory for storing instructions executable on said at least one processor;
- a first computer program embodied as instructions executable on said at least one processor and storable in said memory;
- a concurrent loader for concurrent maintenance of at least one computer program including said first computer program executing on said computer system, said concurrent loader:
- loading a replacement executable code load to a reserved memory area of said computer system while a first computer program is executing, said replacement executable code load embodying a replacement computer program for replacing said first computer program, said first computer program including a plurality of old static data variables, said replacement computer program including said plurality of old static data variables and at least one new static data variable not included in said first computer program;
- relocating each static data variable included in said replacement computer program while the first computer program is executing, wherein relocating comprises, with respect to each said static data variable included in said replacement computer program,
    - (a) if the respective static data variable is an old static data variable, then associating each reference to the respective static data variable in the replacement computer program with a respective memory address in said computer system currently allocated to the respective static data variable for use by said first computer program, and
    - (b) if the respective static data variable is a new static data variable, then allocating a respective unused memory address in said computer system to the respective static data variable and associating each reference to the respective static data variable in the replacement computer program with the respective unused memory address allocated to the respective static data variable;
- bringing the computer system into a state where temporary data are irrelevant for the execution of the first computer program; and
- switching the computer system to stop executing the first computer program and begin executing the replacement computer program, said switching being performed after said loading the replacement executable code load and said locating each static data variable included in said replacement computer program.

12. The computer system of claim 11, wherein the concurrent loader is implemented as firmware.

13. The computer system of claim 11, wherein said relocating each static data variable included in said replacement computer program comprises comparing entries in a symbol table of the first computer program with entries in a symbol table of the replacement executable code load, and, with respect to each said static data variable in the symbol table of the replacement executable code load which is a new static data variable, copying a corresponding symbol table entry for the new static data variable to the end of the symbol table of the first computer program.

* * * * *